Feb. 21, 1933. C. D. GARD 1,898,579
METHOD AND APPARATUS FOR ABSORPTION OF CONSTITUENTS
FROM GASES AND VAPOROUS MIXTURES
Filed May 30, 1930
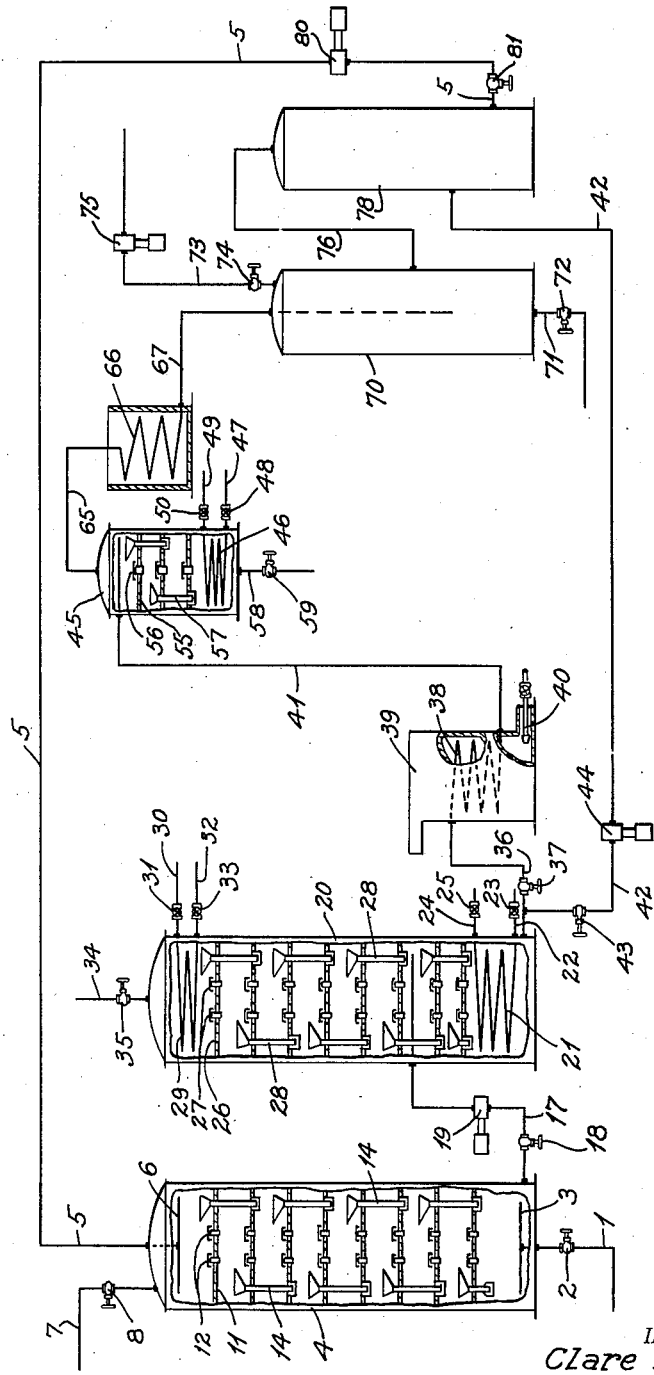
INVENTOR.
Clare D. Gard
BY
ATTORNEY.

Patented Feb. 21, 1933

1,898,579

UNITED STATES PATENT OFFICE

CLARE D. GARD, OF LOS ANGELES, CALIFORNIA, ASSIGNOR TO UNION OIL COMPANY OF CALIFORNIA, OF LOS ANGELES, CALIFORNIA, A CORPORATION OF CALIFORNIA

METHOD AND APPARATUS FOR ABSORPTION OF CONSTITUENTS FROM GASES AND VAPOROUS MIXTURES

Application filed May 30, 1930. Serial No. 457,657.

This invention relates to method and apparatus for separating vapors from gases with absorption oil and is more particularly directed to reclaiming the absorption oil and cyclically circulating it for further contact with the gases to accomplish additional absorption.

I have found that in the separation of complex mixtures of vapors and gases by absorption of fractions thereof, it is highly advantageous to keep the absorption oil free from contamination with heavy oil and other foreign materials which it accumulates during the absorption of the desired constituents. For instance, in the extraction of gasoline from natural gas by absorption of the gasoline fractions in absorption oil, the absorbent becomes contaminated with heavy oil, which the gases also contain in entrainment, together with sediment and other foreign materials. In addition, the absorption oil itself may contain constituents which form gum-like and heavy deposits when the oil is subjected to the heating incidental to the distillation of the absorbed fractions from the rich absorption oil. As these foreign materials accumulate, they progressively lessen the absorptive power of the oil, and gum coats the apparatus, thereby lowering the efficiency of the heat exchange and cooling equipment. The present practice is to use the absorption oil until the accumulation of foreign material causes an unprofitable decrease in gasoline extraction, at which time the entire amount of oil is removed from the system and fresh oil is introduced therein. By this method of operation there is a gradual loss of production of gasoline with a large loss of time while the used absorption oil is being changed for fresh absorption oil.

An object of this invention is to lower the cost of operation of absorption systems by reclaiming and re-using the absorption oil. Another object is to continuously maintain high absorption efficiency by maintaining the recirculated absorption oil at substantially the same degree of efficiency as if it were fresh oil, thereby avoiding the progressively increasing loss of extractable material which has previously occurred in prior processes. Another object is to prevent loss of time heretofore occasioned by shutdown to replace the absorption oil.

More specifically stated, the invention comprises a method of absorbing gases by contacting them with an absorption oil, subjecting the thus enriched absorption oil to distillation in order to volatilize the light, desirable fractions absorbed therein, and separating the absorption oil, which has thus been freed of substantially all of the absorbed light fractions, from the contaminating material which lowers the absorption efficiency of the oil. The invention further comprises distilling off substantially all the desired light fractions from the rich absorption oil, recirculating a portion of the oil to the absorber, and from a second portion thereof separating the aforesaid contaminating material. The invention also comprises removing this contaminating material from the absorption oil by steam and/or vacuum distillation whereby the absorption oil is volatilized and the undesirable constituents remain as bottoms. The invention also comprises apparatus wherein these operations may be accomplished; namely, a system comprising an absorption column, a distilling column for the distillation of the absorbed fractions from the rich absorption oil, together with an auxiliary still in which the lean absorption oil is distilled from the heavy contaminating material, a condenser and means for recycling the condensed absorption oil back to the absorber.

In the accompanying drawing, the figure diagrammatically discloses by way of illustration a preferred embodiment of the invention.

Referring to the figure, numeral 1 represents an inlet pipe for the introduction of vapors which are to be separated by absorption. Line 1 is controlled by valve 2 and terminates in distributor 3 situated within absorption column 4. Absorption oil for use in this column enters through pipe 5, terminating in distributor 6 situated within the column, said absorption oil having been recirculated back to the column in a manner to be described below. Absorption column 4 is also provided with lean gas outlet 7, controlled by valve 8, and with contact plates 11, bubble caps 12 and overflow pipes 14 disposed in the usual manner.

Pipe 17 controlled by valve 18 connects absorption column 4 with distillation column 20 and is adapted to conduct rich absorption oil from the bottom of the absorption column, preferably to an intermediate section of the distillation column, by action of pump 19. Distillation chamber 20 is heated by steam coil 21 comprising inlet 22 controlled by valve 23 and outlet 24, controlled by valve 25. The distillation chamber is further provided with reflux plates 26, bubble caps 27 and overflow pipes 28, disposed in the usual manner. Cooling coil 29 situated in the upper portion of the distillation column is provided with inlet 30 controlled by valve 31 and outlet 32 controlled by valve 33. The rich absorption oil is distilled in the distillation chamber, and the absorbed light fractions are volatilized therefrom and exit through outlet 34 controlled by valve 35. The bottoms from the distillation chamber may totally pass to the absorption oil reclamation system through pipe 36 controlled by valve 37 into primary heating coil 38, situated within furnace 39, heated by burner 40. If desired, the flow of bottoms leaving distillation chamber 20 through pipe 36 may be split, part passing to the absorption oil reclamation system as above described, and a portion by-passing the absorption oil reclamation system by the action of pump 44 in line 42, controlled by valve 43, into absorption oil storage tank 78.

Referring to the absorption oil reclaiming system, the heating coil 38 is connected by pipe 41 to auxiliary still 45, heated by steam coil 46 comprising inlet 47 controlled by valve 48 and outlet 49, controlled by valve 50. This auxiliary still is further provided with fractionating plates 55, bubble caps 56 and overflow pipes 57 disposed in the usual manner, and bottom draw-off 58 controlled by valve 59. The auxiliary still may be elevated above the lean oil take-off of the distillation column. This establishes a hydrostatic head and makes unnecessary the use of a high pressure in the auxiliary still as well as the use of a pump in outlet 58 for discharging the bottoms from the auxiliary still.

Pipe 65 conducts vapors from still 45 to water cooled condenser 66 which is connected by pipe 67 with separator 70, wherein oil is separated from any water present. The water is removed through pipe 71, controlled by valve 72. Vacuum pump 75 connected to separator 70 by pipe 73, controlled by valve 74, maintains sub-atmospheric pressure in the separator 70, condenser 66, auxiliary still 45, primary heater 38 and their connections as far back in the system as valve 37. Absorption oil is removed from the separator 70 through line 76 which connects with absorption oil storage tank 78. Pump 80 is provided in line 5, controlled by valve 81, for the purpose of recirculating absorption oil from storage 78 to the absorption column 4.

If desired, steam may be directly introduced into the oil in the distillation column. Furthermore, steam may also be introduced into the auxiliary still 45, with or without the application of vacuum therein. If the absorption oil reclamation system is not to be operated under vacuum, the action of vacuum pump 75 is omitted. In this event, a pump may be interposed in line 36 if the pressure in the distillation column 20 is not sufficient to force the bottoms therefrom through the primary heater and line 41 into the auxiliary still 45.

In operation, complex gases, such as natural gas containing gasoline fractions, to be separated by absorption of the gasoline constituents, enter through pipe 1 and distributor 3 into the lower portion of absorption column 4. The gases pass in countercurrent with descending absorption oil which enters the top of the column through pipe 5 and distributor 6. The liquid descends on a series of contact plates 11 connected by overflow pipes 14, while the gases ascend through bubble caps 12 and thereby contact with the absorption oil in the usual manner. Lean gases substantially free of their absorbable constituents are removed from the top of the column through line 7, controlled by valve 8, and may be disposed of in any convenient manner. In addition to the desired absorbed fractions contained in the rich absorption oil collecting in the bottom of the absorption column, there are usually present certain heavier constituents likewise absorbed from the complex gaseous mixture. The liquid in the bottom of the absorption column may also be contaminated with sediment removed from the gas.

The rich absorption oil containing the above mentioned constituents is next passed by pump 19 through line 17 controlled by valve 18 to preferably an intermediate zone of distillation column 20. The liquids accumulate in the bottom of this distillation column and are distilled by the heat furnished by steam coil 21, in order to volatilize the light desired constituents which have been absorbed in the absorption oil. Also, if desired, steam may be introduced directly into the oil. The vapors issue from the distillation column through line 34 controlled by valve 35. Reflux may be produced by contact of the vapors with cooling coil 29, through which any suitable cooling medium may be passed. The reflux will then pass downwardly on reflux plates 26 connected by overflow pipes 28, while vapors will ascend through bubble caps 27 and contact with the reflux in the usual manner. The bottoms remaining in the distillation column contain absorption oil, absorbed heavy constituents and sediment. As previously described, this contaminating material lessens the absorptive powers of the absorption oil which therefore must be reclaimed before it can be recirculated into the absorption column.

If the used absorption oil exiting from distillation column 20 by pipe 36 does not contain undesirably large quantities of contaminating material, it may not be necessary to pass the total amount of the absorption oil through the absorption oil reclaiming system in order to maintain proper efficiency of absorption in absorption column 4. In this event, a part of the bottoms from the distillation column may be by-passed into line 42 by opening valve 43. These bottoms are then forced by pump 44 directly into the absorption oil storage tank 78.

The absorption oil to be reclaimed for further use is removed from the distillation column 20 through line 36, controlled by valve 37, and is additionally heated in heating coil 38. Considerable heat is conserved by reclaiming the absorption oil while it still contains the heat obtained in distilling column 20. As previously described, the units of the system between valve 37 and vacuum pump 75 may be maintained under sub-atmospheric pressure. Due to the pressure difference between distillation column 20 and the absorption oil reclaiming system, the oil will flow through primary heater 38 into the elevated auxiliary still 45 without the aid of a pump or the like. Steam coil 46 in auxiliary still 45 aids in volatilizing the absorption oil maintained under vacuum produced by vacuum pump 75. If it is desired, steam may be introduced directly into the oil in the auxiliary still, and distillation may proceed therein with or without the application of sub-atmospheric pressure created by vacuum pump 75. If the vacuum is not to be employed and the pressure in the distillation column 20 is not sufficient to force the bottoms therefrom into the auxiliary still 45, an additional pump may be provided in line 36 for this purpose. The heavy absorbed contaminating material and sediment remain as bottoms in the auxiliary still and are removed therefrom through line 58 controlled by valve 59. By elevating the auxiliary still, the use of high pressure therein, or of a pump in outlet 58 is rendered unnecessary for removing the distillation bottoms, due to the hydrostatic head thereby produced.

The vaporized absorption oil passes from the auxiliary still 45 through vapor line 65 to condenser 66. The condensates are conducted therefrom by line 67 into separator 70 in which any water present may settle out and be removed through line 71 controlled by valve 72. Separator 70 is connected with vacuum pump 75 by line 73 as described above. The absorption oil is removed from separator 70 and is conducted to absorption oil storage tank 78 by line 76. It may be recycled from the storage tank to absorber 4 by pump 80 situated in line 5 controlled by valve 81.

This system is particularly adapted for the separation of gasoline from natural gas, but it may also be applied to the extraction of absorbable constituents from other complex gaseous mixtures. The above disclosure is to be taken merely as illustrative of a preferred embodiment of my invention and is not to be considered limiting, since many variations thereof may be made within the scope of the following claims.

I claim:

1. A process of separating gases which comprises continuously absorbing a portion of said gases in an absorption menstruum, separating absorbed material from said menstruum and returning said menstruum to the cycle to absorb more gases, and continuously purifying said returning menstruum by distillation thereof.

2. A method for the purification of absorption oil comprising distilling hot denuded absorption oil to produce heavy bottoms and a desired overhead vapor cut of absorption oil, condensing the overhead, and returning the condensed portion to the absorption system.

3. A method for the purification of absorption oil comprising diverting a portion of hot denuded absorption oil, distilling said diverted portion to produce heavy bottoms and a desired overhead vapor cut of absorption oil, condensing the overhead, and returning the condensed portion to the main body of absorption oil.

4. A vapor recovery process comprising subjecting vapor-laden gases to intimate contact with an absorption oil, heating the rich oil to liberate the absorbed vapors, dividing the lean oil, returning one portion to the absorption system, diverting the other portion, distilling said other portion to separate contaminating materials and bottoms and to drive over purified absorption oil vapors, condensing the absorption oil vapors and returning them to the absorption system.

5. A vapor recovery process comprising subjecting vapor-laden gases to intimate contact with an absorption oil, heating the rich oil to liberate the absorbed vapors, dividing the lean oil, continuously returning one portion to the absorption system, diverting the other portion, distilling said other portion to separate contaminating materials and bottoms and to drive over purified absorption oil vapors, condensing the absorption oil vapors and continuously returning them to the absorption system.

6. A method for the continuous purification of lean recycled absorption oil following the distillation of the rich absorption oil comprising distilling said lean absorption oil, while still hot, to vaporize the main portion of the absorption oil and to separate contaminating materials as bottoms, condensing the absorption oil vapors, and recycling them for further enriching.

7. A method for the continuous purification of recycled absorption oil comprising diverting a portion of the lean absorption oil following distillation of the rich absorption oil, and while still hot, distilling said diverted portion to vaporize the main portion of the absorption oil and to separate contaminating materials as bottoms, condensing the absorption oil vapors, and returning them to the recycling absorption oil body.

8. A system for absorption of vapors and purification of absorption oil comprising an absorption column, a distilling column connected therewith for the distillation of rich absorption oil, means to conduct rich oil from said absorption column to the distillation column, an auxiliary still, means to conduct lean absorption oil from the distillation column to the auxiliary still, means to withdraw bottoms from the auxiliary still, means to remove absorption oil vapors from said auxiliary still, and means to condense and return the absorption oil vapors to the absorption system.

9. A system for absorption of vapors and purification of absorption oil comprising an absorption column, a distilling column connected therewith for the distillation of rich absorption oil, means to conduct rich oil from said absorption column to the distillation column, means to return lean oil from the distillation column to the absorption column, an auxiliary still, means to divert a portion of the lean absorption oil and conduct it to the auxiliary still, means to withdraw bottoms from the auxiliary still, and means to remove absorption oil vapors from said auxiliary still, and means to condense and return the absorption oil vapors to the absorption system.

10. A system according to claim 8, wherein the auxiliary still is elevated above the lean oil take-off of the distillation column to establish a hydrostatic head, and means to impose a reduced pressure on the auxiliary still with respect to the pressure in the distillation column.

Signed at Los Angeles, in the county of Los Angeles and State of California, this 19th day of May A. D. 1930.

CLARE D. GARD.